(No Model.) 8 Sheets—Sheet 1.

W. MAIN.
POWER TRANSMITTING DEVICE.

No. 407,087. Patented July 16, 1889.

Fig. 1.

Witnesses
J. J. Kennedy
F. H. Palmer

Inventor
William Main
By his Attorneys
Philipp, Phelps & Hay (No Model.)  8 Sheets—Sheet 3.

W. MAIN.
POWER TRANSMITTING DEVICE.

No. 407,087. Patented July 16, 1889.

Witnesses
J. J. Kennedy
F. H. Palmer

Inventor
William Main
By his Attorneys Philipp, Phelps & Hoey (No Model.) 8 Sheets—Sheet 4.
W. MAIN.
POWER TRANSMITTING DEVICE.

No. 407,087. Patented July 16, 1889.

WITNESSES:
J. J. Kennedy
T. H. Palmer

INVENTOR
William Main
BY Philipp Phelps ottorny

ATTORNEYS (No Model.) 8 Sheets—Sheet 6.

W. MAIN.
POWER TRANSMITTING DEVICE.

No. 407,087. Patented July 16, 1889.

WITNESSES:
J. J. Kennedy
T. H. Palmer

INVENTOR
William Main
BY Philipp Phelps Horny
ATTORNEYS

N. PETERS, Photo-Lithographer, Washington, D. C.

(No Model.) 8 Sheets—Sheet 7.
W. MAIN.
POWER TRANSMITTING DEVICE.

No. 407,087. Patented July 16, 1889.

WITNESSES:

INVENTOR
William Main
BY Philipp Philpot vary
ATTORNEYS (No Model.) 8 Sheets—Sheet 8.

W. MAIN.
POWER TRANSMITTING DEVICE.

No. 407,087. Patented July 16, 1889.

Witnesses

Inventor
William Main
By his Attorneys

UNITED STATES PATENT OFFICE.

WILLIAM MAIN, OF BROOKLYN, NEW YORK.

POWER-TRANSMITTING DEVICE.

SPECIFICATION forming part of Letters Patent No. 407,087, dated July 16, 1889.

Application filed June 13, 1888. Serial No. 276,982. (No model.)

*To all whom it may concern:*

Be it known that I, WILLIAM MAIN, a citizen of the United States, residing at Brooklyn, county of Kings, and State of New York, have invented certain new and useful Improvements in Power-Transmitting Devices, fully described and represented in the following specification and the accompanying drawings, forming a part of the same.

The object of my invention is to provide a simple and compact device for transmitting motion from a power-shaft or the like to mechanism to be driven thereby.

It consists in the main in the application for the transmission of power of what is known as the "Watt sun-and-planet gear" by means of mechanically practical mountings and connections in such manner as to impart motion to the driven mechanism only when the oscillating member of said gear is restrained to constant parallelism by means of a connection or guide mechanism extending from the oscillating gear to a guide-bearing, which guide-bearing moves with it when the power is not being transmitted, but may be arrested or retarded, so as to throw the driving and driven mechanism into operative connection, and in such manner that uniformity of speed shall be imparted to the driven mechanism.

In order that the scope of my invention and the variety of its possible applications may be understood, I will here explain the difficulties which have attended the use of this gearing and the various devices which may be used in order to overcome them and make the gearing practically useful.

The principal difficulty contended with in applying the Watt sun-and-planet gear has been that of securing uniformity of speed in the driven mechanism. To secure such uniformity, it is requisite that the driving-wheel of the series should occupy in all periods of its motion positions parallel to its original position, as does, for instance, the connecting-bar between the drivers of a locomotive. If the driving-wheel has, in addition to its oscillating motion, an angular swing, the motion of the driven wheel will not be uniformly proportioned to that of the driving-shaft, upon which the driving-wheel is loosely mounted, nor to that of the driving crank or eccentric connecting said shaft to the driving-wheel. It is essential that parallelism of the driving-wheel throughout its entire movement shall be secured, so that a line drawn in the plane of the driving-wheel at one period of its movement, the power-transmitting mechanism being in full operation, will at any other period thereof remain parallel to its original position, since only when such parallelism be maintained will the motion of the driven wheel be uniform. Otherwise stated, a line drawn in the plane of the driving-wheel must at all times during the motion of the wheel remain parallel to a line fixed in space, which it will necessarily be if it remains parallel with itself. This conception, however, is simpler than the conception of parallelism of the successive positions of a moving line, and may therefore be adopted. The parallel moving line is in the case of the sun-and-planet gear represented by the driving gear-wheel. All points of this wheel, or, what is the same thing, any two selected governing-points must have motion simultaneously identical in direction and amount. The first problem encountered has therefore been how to so constrain the driving-wheel that while it shall be free to oscillate about a fixed center a line drawn through its plane shall at all times remain parallel to a given fixed line, the fixed line being a standard to a constant relation with which the governing-points of the wheel are held as they move by mechanical elements.

Constrained motion may be obtained in two ways only: first, by sliding against or between fixed guiding lines or surfaces; second, by a swinging or revolving motion referred to a fixed line or points. No other methods of constraining motion are mathematically possible. Embodied in mechanism we may say, broadly, that constrained motion may be obtained mechanically in two ways only: first, by the use of guides consisting of slides and directing-surfaces by which they are controlled; second, by the use of guides consisting of swinging connections with fixed or relatively-fixed centers.

As the driving-wheel has necessarily a movement of complete oscillation about a center, provision must be made for parallel movement in at least two directions. This may be accomplished by means of a double slide or a double swing, or a slide in one direction and a swing in the other, or a movement of complete rotation. Invention is limited to these means and the permutation and combination of them, although endless varieties of form and dimension may be devised by the mechanic.

My present invention, as stated in this application and others filed of even date herewith, consists in part of novel forms of guides devised by me for this purpose, and more particularly as regards the present application in a device by which the operative action of the guides or guide mechanism is controlled and graduated. This device consists of a guide-bearing to which the guides are connected, which normally moves with the oscillating gear when power is not being transmitted, but may be restrained or retarded, so as to throw the driving and driven mechanism into operative connection, as before stated. As this controlling device is applicable to each of the general types of guides which may be employed, I will now describe those types, taking up, first, illustrations of the double-slide arrangement; second, illustrations of the double swing; third, a mechanism showing complete rotation, and, fourth, a mechanism illustrating the combination of the slide and swing.

In the drawings forming a part of the specification and illustrating my invention, Figs. 6, 7, 8, 9, 10, 11, 12, 13, and 14 represent the several other types.

In the form of my invention illustrated in Figs. 1 to 4, and wherein parallelism of the governing points of the driving-gear is maintained by guides consisting of double slides controlled by directing-surfaces, 1 indicates a driving-shaft adapted to be operated from any convenient source of power. This shaft carries fast upon it an eccentric 2, which moves freely within a circular opening in a gear-wheel 3, which constitutes the fixed or initial member of the sun-and-planet series. Outside of and about this gear-wheel is an annular gear 4, concentric with the driving-shaft 1 and bolted to a flange 5 of a sleeve or hollow shaft 6, mounted upon the main shaft and carrying at its center a flange 7, to which are bolted the two halves 8 and 9 of a gear-wheel forming a part of or from which the power is transmitted to the driven mechanism. The sleeve 6 rests in any suitable bearings, as 10. At the opposite end of the sleeve is a second flange 11, with which is connected a second set of devices identical with those above described, except that the ratio between the inner and outer gear-wheels is varied, this additional mechanism being provided in order that it may be possible to vary the speed of the driven mechanism. These two devices at the ends of the sleeve in Fig. 1 being identical in construction, with the exception, as stated, that the ratio between the gear-wheels varies, the same numbers of reference have been applied to the parts in each case, and the following description may be understood as applicable to both parts of the device.

Figure 1:
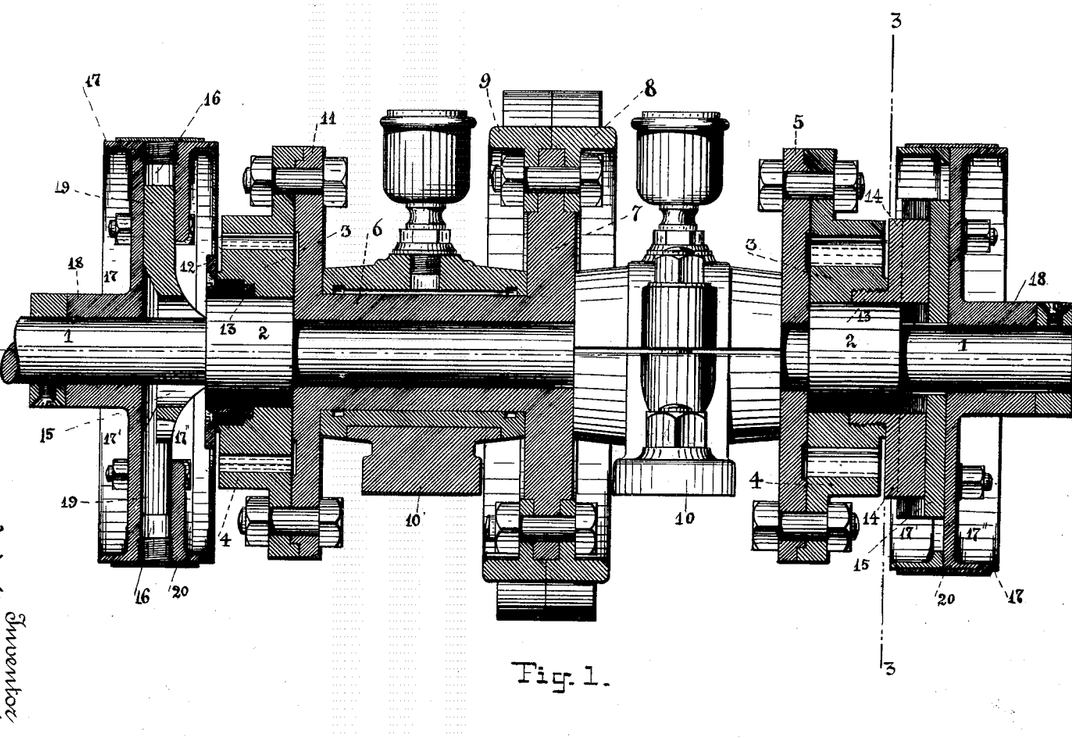
Figure 1 is a side elevation, partly in section, of one form thereof.

To the inner gear-wheel 3 is rigidly fixed a slide 12, from the center of which projects an annular screw-threaded rim 13, which enters the interior of the gear and is locked therein, as shown in the left-hand part of Fig. 1. This slide is provided with lugs 14, which fit a recess in second slide, for convenience termed a "cross-head," 15, in turn provided with cylindrical lugs 19, fitting cylindrical sockets 16, formed in a pulley 17, mounted upon and rotating about the main shaft. This pulley 17, which embodies the restrainable guide-bearing for the sliding guides of the oscillating wheel, is made up of two castings 17′ 17″, bolted together, as shown, one of the castings 17″ having a hub 18, which constitutes the bearing of the pulley. The cross-head 15 has an oblong central opening which permits it to move in the direction of its lugs 19 over the main shaft 1.

It is obvious that the gear 3 and the pulley 17 will maintain fixed positions relative to each other as regards rotation, their absolute relative positions changing as the shaft 1 revolves to the extent of the sliding motion of the slide with reference to the gear and of the cross-head with reference to the pulley, caused by the eccentric position of the gear 3 with reference to the axis of the pulley 17, the slide 12 and cross-head 15 constituting double slides, moving in right lines and uniting the gear and the pulley as regards circular motion. Consequently, when the pulley 17 freely revolves about its axis, the gear 3 is also free and will convey no power from the shaft to the outer gear 4. When, however, the pulley 17 is locked or held fast in one position, the gear 3 will be carried about by the eccentric in a position constantly parallel to itself, and will communicate to the outer gear 4 a rotating motion reduced to an extent dependent upon the ratio between the two gears. The amount of this reduction may be readily calculated according to well-known rules which require no special explanation here. In other words, the line of the governing-points of the gear 3, which in this case we may conceive to be the locking-screws between the wheel and the rim 13, (see Fig. 1,) is constrained to always maintain as the gear 3 oscillates, positions of parallelism with a fixed line, represented here by the axial line of lugs 19, the mechanism effecting the constraint being slide 12 and cross-head 15.

Figure 2:
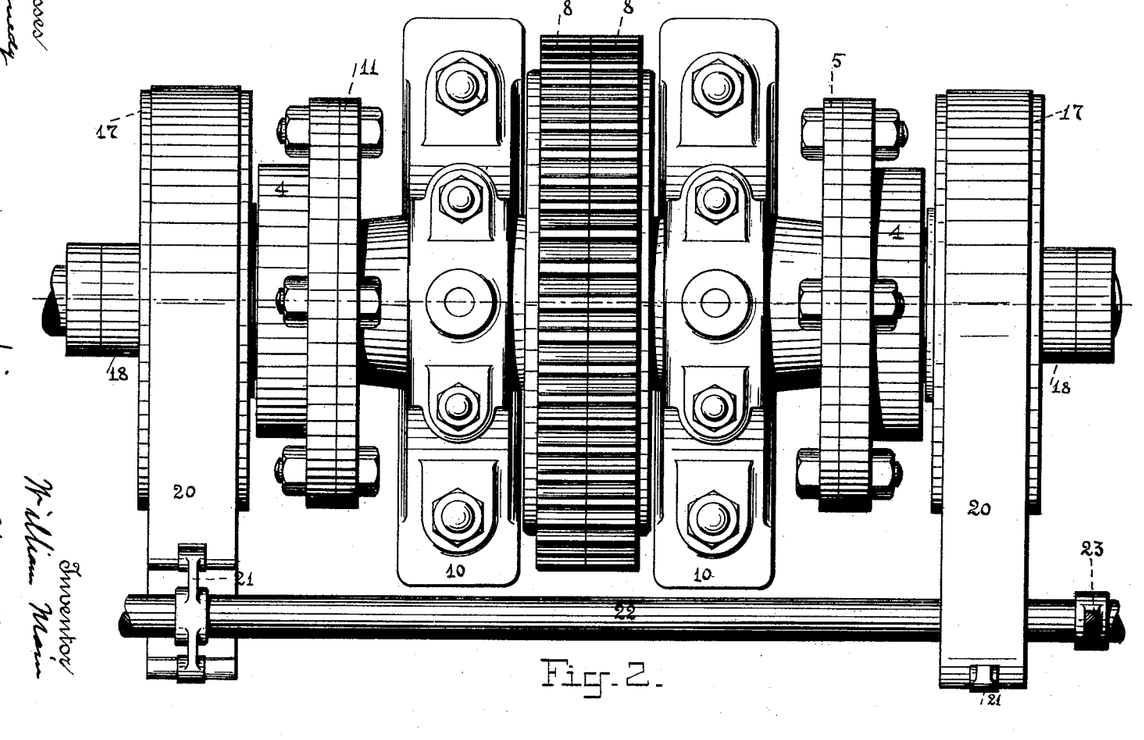
Fig. 2 is a plan view of the same.
Figure 3:
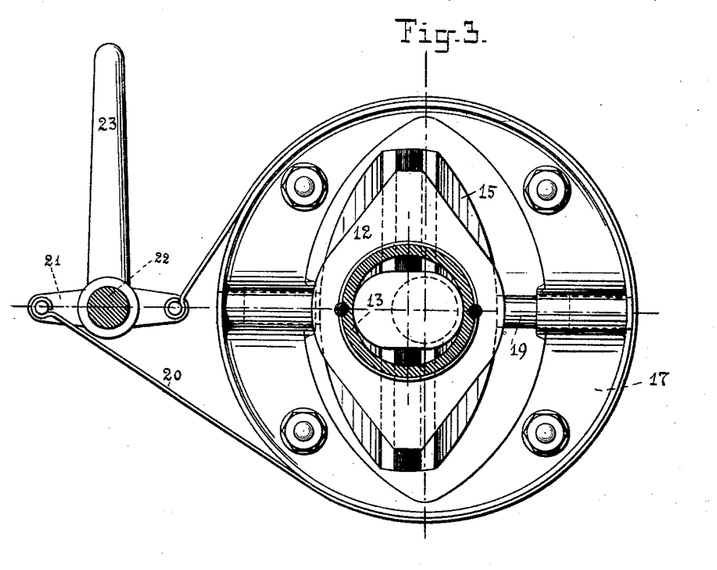
Fig. 3 is a section on the line 3 3 of Fig. 1, the point of view being to the left of said figure, the shaft with its eccentric being taken out.
Figure 4:
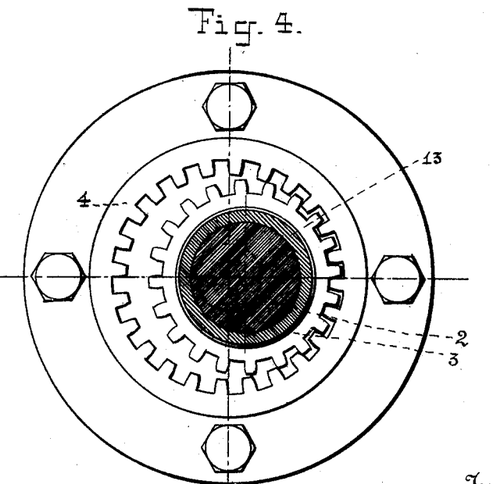
Fig. 4 is a section taken on the same line, the point of view being to the right of said figure.

It is necessary to provide devices for the locking of the pulley 17 in order to effect the transmission of power through the gears, and for this purpose I prefer to use a friction-brake, (although any other form of suitable brake mechanism may be employed,) as illustrated in Figs. 1, 2, and 3, wherein a strap 20 passes about the pulley 17, the ends of the strap being pivoted to a cross-piece 21, fastened upon a shaft 22, which shaft is revolved as desired by a handle 23 attached thereto, whereby the strap is tightened or loosened to arrest or release the pulley. In the mechanism shown two of these straps are used, one for each pulley, so connected with their arms 21 that in one position of the shaft 22 one of the said pulleys is arrested and the other released, and in the other position thereof the action of the straps upon the pulleys is reversed. By the use of this mechanism either one of the two sets of gears may be brought into operation, according to the speed desired to be given to the driven mechanism. If more than two speeds are desired for the driven mechanism, the number of sets of gears may be accordingly increased.

Figure 5:
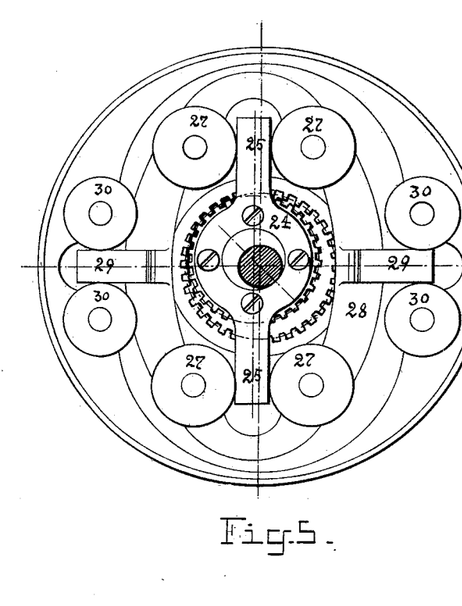
Fig. 5 is a modification of the same general type.

In Fig. 5 I have illustrated a modification of the double slide-connections. In this instance a slide 24, provided with lugs 25, is rigidly attached to the driving member of the sun-and-planet gear, said lugs fitting between friction guide rollers or disks 27, mounted upon a cross-head 28. The cross-head is provided with lugs 29, fitting between friction guide rolls or disks 30, mounted upon the face of the pulley-brake. This form is substantially identical with that above described, with the addition of friction-rollers, for which any other friction device may be substituted. If the rollers were segmental instead of circular and of sufficient diameter, the same result would be obtained.

I will now proceed to describe that general type of guides in which the oscillating gear-wheel is restrained by swinging connections with that part of the machine representing the fixed line.

The swinging motion may take place in a plane parallel to the axis of rotation or in a plane perpendicular to the axis of rotation, or in a plane intermediate between the two, but preferably in either the parallel or the perpendicular plane. The swinging motion must be double in order to permit complete oscillation of the gear-wheel about its center, or it must be a motion of complete rotation in a plane perpendicular to the axis of rotation of the gear-wheel.

Figure 7:
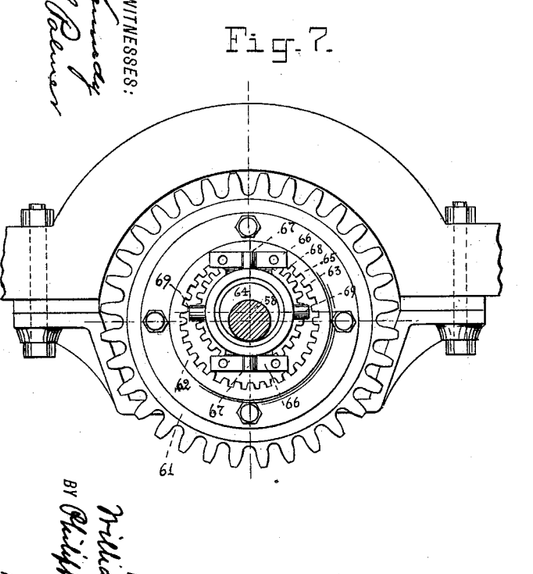
Figure 8:
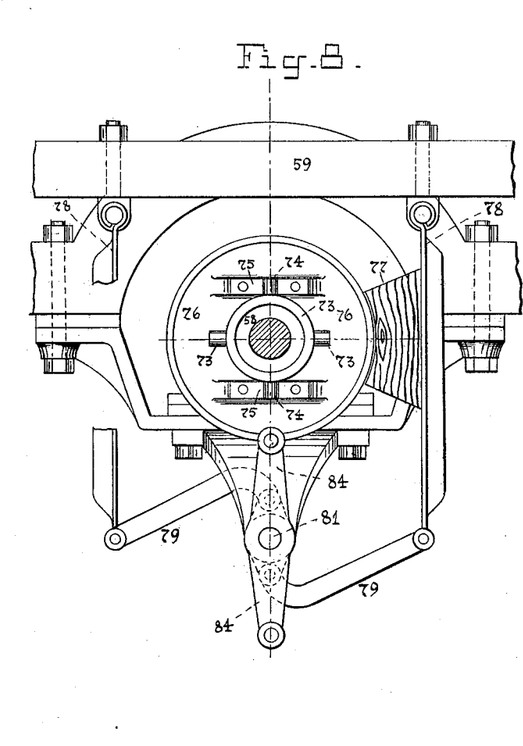
Figure 10:
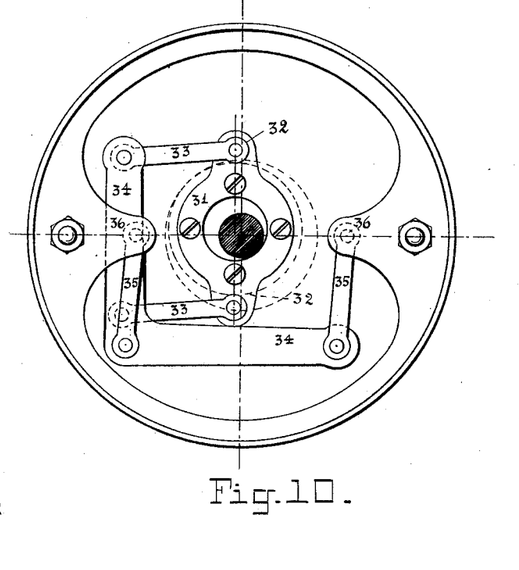
Figure 11:
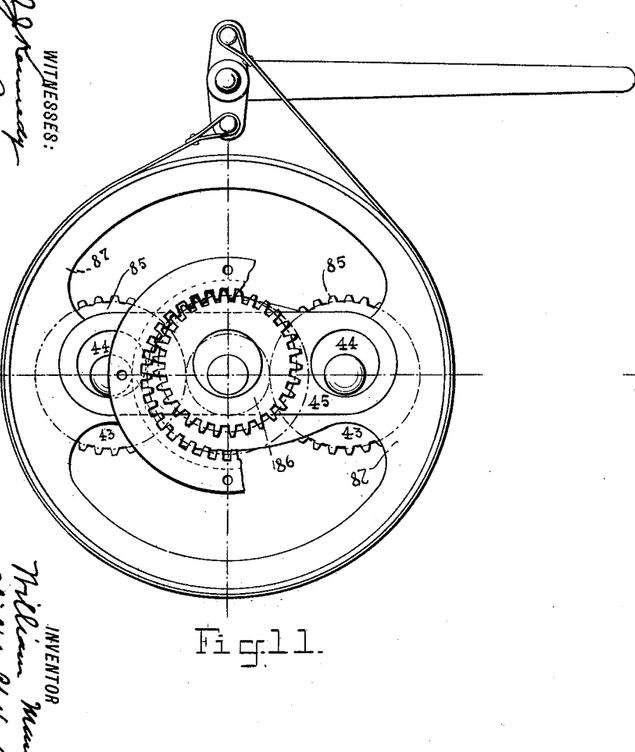

Figs. 6, 7, 8, and 9 represent a form of my invention in which the guides consist of double swinging connections, the swinging motion being in planes parallel to the axis of rotation of the gear-wheel, Fig. 6 being a side elevation partly in section, Fig. 7 a section on the line 7 7 of Fig. 6, Fig. 8 a section on the line 8 8 of Fig. 6, and Fig. 9 illustrating diagrammatically this form of my invention. Fig. 10 represents a form of my invention in which the guides consist of double swinging connections, the swinging motion being in a plane perpendicular to the axis of rotation of the gear-wheel; and Fig. 11 represents a form of my invention in which the guides consist of swinging connections moving in paths of complete rotation lying in a plane perpendicular to the axis of rotation of the gear-wheel.

For convenience of description and in order to illustrate a practical application of my invention I have shown in Fig. 6 the power-shaft 58 as connected with and driven by an electric motor arranged in this case in suitable bearings beneath the platform-body 59 of a car-frame from which said bearings are suspended. Upon the power-shaft is mounted the hollow shaft 60, bearing the driven cog-wheel 61, from which motion is communicated to the car-driving axle in any convenient manner. The cog-wheel 61 is connected rigidly with the driven gear 62 of the sun-and-planet series, and the driving-gear 63 is mounted upon an eccentric 64, fixed to the power-shaft.

The oscillating driving-gear is provided with an annulus 65, attached to it by screw-thread, and provided with lugs 66, forming bearings for the trunnion-pin projections 67 of a ring 68. Said ring is provided also with additional trunnion-pins 69, upon which are hung the lugs 70 of a two-part swinging sleeve 71, the whole forming a universal joint. The sleeve 71 is connected at its opposite end by lugs 72, ring 73, and trunnion-pins 74 to the projections 75 from pulley 76. By means of these universal-joint connections I obtain a double swinging motion, the planes of swing being parallel to the axis of rotation and perpendicular to each other, the resulting motion being that of a conical pendulum swinging in a circular path around the axis of rotation, the axis of rotation of the sleeve describing in so doing a conoidal surface, as illustrated in Fig. 9, the broken line $x$ representing the center of the driving-shaft and the full line $y$ the axis of the sleeve. This arrangement I prefer when space will allow, as the motion on the pins of the universal joints is very small and lubrication easily provided for. The pulley 76 subserves similar functions to the pulley 17, described with reference to Figs. 1 to 4. Instead of the strap or band made use of in the latter construction, however, I avail myself in this of wooden brake-blocks 77, suspended from the car-frame by links 78, said links being connected at their lower ends by additional links 79 to lugs 80 upon a shaft 81, supported in a tubular bearing 82, depending from the frame.

The shaft 81 is provided at its outer end with the arms 84, from which by chain or rod connections or the like it may be operated to apply or release the brake-blocks, according as the driving-gear is to be thrown into or out of operative connection with the driven gear of the sun-and-planet system.

The sliding clutch 83 is provided for locking the hollow shaft to the driving-shaft in order, when desired, to give to the former the speed of the latter.

In the form of my invention shown in Fig. 10, wherein the guides consist of double swinging connections, the swinging motion being in a plane perpendicular to the axis of rotation of the gear-wheel, the plate 31, rigidly attached to the driving-gear of the sun-and-planet series, is provided with lugs 32, from which connection is made by links 33 with a block 34, in this case, but not necessarily, of bell-crank form, which block is in turn connected by links 35 with lugs 36 upon the pulley.

Fig. 11 is a view taken from the side of the eccentric wheel opposite to the friction-pulley, and shows the friction-pulley and connected parts in the background partly in broken lines. In the construction shown in this figure, which represents my invention applied to a form of guides consisting of swinging connections moving in paths of complete rotation in a plane perpendicular to the axis of rotation of the gear, a link 45 is provided, which is attached rigidly to the driving member of the gear, this link having in each end a circular aperture fitted upon an eccentric 44. These eccentrics 44 are each rigid with a pin 84, these pins being journaled in and passing through the web 87 of the friction-pulley and having keyed thereon, upon the opposite side of the pulley, gear-wheels 85. These gears 85 intermesh with a gear 86 fast upon the driving-shaft, and by this gear 86 the wheels 85 are rotated. The link completes a reciprocation for each revolution of the gear-wheels 85 and pins 84, and consequently has a constant parallel motion so long as the friction-pulley is held in one position, which is imparted to the driving member of the sun-and-planet gear. When, however, the friction-pulley is permitted to revolve, the link 45 and the driving member of the gear revolve with it and no power is transmitted.

The above form of guide mechanism is more fully described in my application, Serial No. 276,987, filed of even date herewith.

Figure 12:
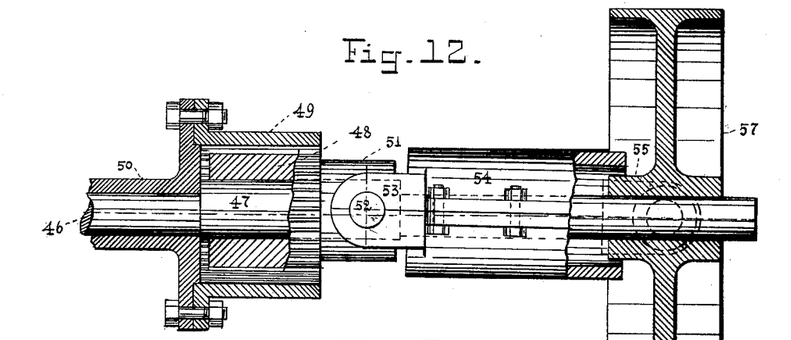
Figure 13:
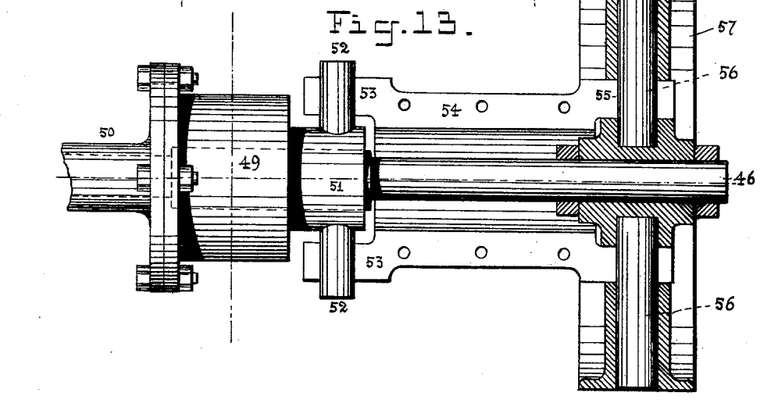
Figure 14:
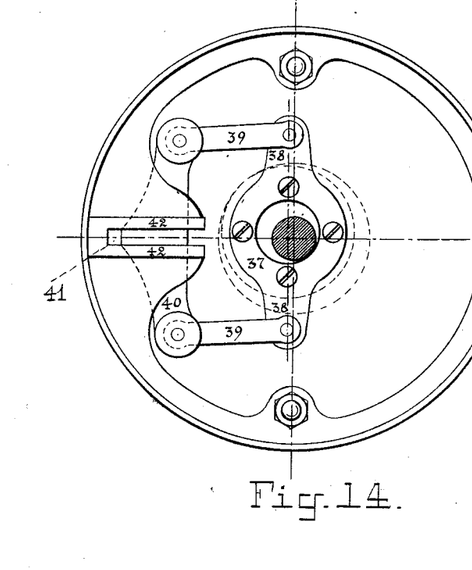

I will now proceed to describe that general type of guides combining a swinging connection and a sliding connection—that is, having a swing in one direction and a slide in the other. This type of guides may be formed by the substitution of a sliding connection for one of the swinging connections in either of the forms of double swinging connections—that is, either the form represented in Fig. 6, where the swing is in a plane parallel with the axis of rotation of the oscillating gear, or the form represented in Fig. 10, where the swing is in a plane perpendicular to the axis of rotation of the oscillating gear. An example of the former of these constructions is represented in Figs. 12 and 13, and an example of the latter is represented in Fig. 14. In the form shown in Figs. 12 and 13 the power-shaft 46 has the usual eccentric 47 rigid with it, said eccentric carrying the oscillating gear 48, while the driving-gear 49 is attached to the hollow driven shaft 50, as hereinbefore described. The oscillating gear is provided at its outer end with a basal projection 51, carrying trunnion-pins 52. These trunnion-pins have a bearing within lugs 53, projecting from a hollow two-part sleeve 54, said sleeve being provided at its opposite end with lugs 55, swinging upon trunnion-pins 56, which have their bearings in the pulley 57. The trunnions permit the necessary swinging motion in one direction and also a sliding motion at right angles thereto. In this case there will take place a longitudinal sliding motion of the oscillating gear equal to the distance between the middle point of the arc of swinging motion of the sleeve and the chord of said arc. The movement of the oscillating gear will therefore be a resultant of movement in three planes instead of in two, as in the other constructions described.

In the construction shown in Fig. 14, wherein the guides consist of a swinging connection combined with a sliding connection in a plane perpendicular to the axis of rotation of the oscillating gear, a plate 37 is rigidly attached to the oscillating gear and provided with lugs 38, which are connected by links 39 to a cross-head 40, having a lug 41 fitting between guides 42, attached to the friction-pulley. Swinging motion of the oscillating gear is permitted in one direction by the links 39, and sliding motion in a direction at right angles thereto is permitted by the slide 41, moving between the guides 42.

The several constructions hereinbefore described illustrate typically all the forms of mechanism, whereby a gear-wheel oscillating about a center may be constrained to parallelism with a fixed line.

I have hitherto referred to the several forms of mechanism for restraining the motion of the oscillating gear as connections between that gear and a fixed line found in the brake-pulley. It is obvious, however, that this line need not be absolutely fixed, but may be fixed only relatively to the oscillating gear-wheel. In practice it is desirable that it should be movable relatively to the oscillating gear-wheel, so that power may be imparted to the driven machinery through the gear-wheels gradually and without sudden jar, and so that, if desired, the speed of power transmission may be varied within limits without changing from one set of gear-wheels to another. It is for this reason that the part of the mechanism which represents the fixed line to which the motion of the oscillating gear is referred is preferably made in the form of a pulley capable of rotation and having means adapted thereto for checking or wholly stopping such rotation. I do not confine myself to such a construction of this element of the mechanism; but it is, for the reasons stated, a desirable construction. With it my invention is superior to all other power-transmitting devices with which I am acquainted, in that it permits the power of the driving-shaft to be applied with the utmost advantage to the starting of the driven mechanism at the moment of starting.

In other applications filed of even date herewith I have described at length and claimed specifically each of the several types of guides above described, (with the exception of the type shown in Fig. 6, which is herein claimed, and that shown in Figs. 1 to 5, which is described at length and claimed in an application filed by me August 27, 1887, Serial No. 248,011). I have also claimed in said application No. 248,011 the means shown in Fig. 6 for connecting directly the driving and driven shafts. I do not, therefore, claim such features in this application, which I intend shall form the broad application for my apparatus, claiming herein generically subject-matter common to all of the different organizations of parts shown herein, including that of my said former application, the several specific constructions being shown herein to illustrate actually and fully the broad scope of my invention and a number of the different types of mechanism in which it may be embodied. Certain claims herein contained referring to guides consisting of swinging connections are, however, intended to include the forms shown in Figs. 10 and 11, as well as that shown in Fig. 6.

In another application filed of even date herewith I have claimed the method involved in the practice of my invention, and I do not, therefore, claim such method in this application.

I do not confine myself to that form of the sun-and-planet gear in which the driving member is within the driven member. The driving member may be without, as in the original invention of Watt. So, too, the power may be transmitted with an increase as well as a reduction of speed, and the oscillating wheel may be the driven instead of the driving gear. Nor do I limit myself to a sun-and-planet system in which there are but two gears. There may be intermediate gear-wheels between the driving and the driven gear, and the restraining mechanism may be applied to any one of these gear-wheels. My invention lies, broadly, in the combination of a guide-bearing, such as I have described, with a gear-wheel oscillating about a center, said guide-bearing normally moving in unison with the oscillating gear-wheel, but being restrainable in such a way as to cause the gear-wheel to maintain parallelism between a line therein and a line fixed in space, and the manner of mounting the wheel and of transmitting power to and from it are immaterial to my invention, considered broadly.

In this specification and in the claims I have used the terms "guides" and "guide mechanism" as synonymous and as referring to and including all forms of devices or mechanisms by means of which a connection may be made between the oscillating gear-wheel and the restrainable bearing irrespective of the number of pieces of which such devices or mechanisms are composed.

I intend to claim herein the particular form of guide mechanism shown in Fig. 6 whether that mechanism connects the oscillating gear-wheel with a movable or absolutely-fixed bearing.

Having thus described my invention, what I claim, and desire to secure by Letters Patent of the United States, is—

1. A power-transmitting device for connecting a driving-shaft with a driven mechanism, consisting of a set of gear-wheels, one of said wheels having a rotary and also an oscillating motion, a restrainable guide-bearing normally rotating with said oscillating wheel, and guide mechanism for restraining the rotary motion of said oscillating wheel when the guide-bearing is restrained, substantially as described.

2. A power-transmitting device for connecting a driving-shaft with a driven mechanism, consisting of a set of gear-wheels, one of said gear-wheels having a rotary and also an oscillating motion, and a restrainable guide-bearing normally moving with said oscillating wheel and connected therewith by guide mechanism having a swinging motion about centers, substantially as described.

3. A power-transmitting device for connecting a driving-shaft and a driven mechanism, consisting of a set of gear-wheels, one of said gear-wheels having a rotary and also an oscillating motion, a restrainable guide-bearing moving with said oscillating wheel and connected thereto by guide mechanism having a swinging motion about centers, and a brake for arresting the movement of said guide-bearing, substantially as described.

4. A power-transmitting device for connecting a driving-shaft with a driven mechanism, consisting of a set of gear-wheels, one of said gear-wheels having a rotary and also an oscillating motion, a restrainable guide-bearing moving with said oscillating wheel and connected thereto by guide mechanism having a swinging motion in two directions, and a brake for arresting the movement of said guide-bearing, substantially as described.

5. A power-transmitting device connecting a driving-shaft with a driven mechanism, consisting of a set of gear-wheels, one of said gear-wheels having a rotary and also an oscillating motion, a rotatory pulley normally rotating with said oscillating wheel and connected therewith by guide mechanism having a swinging motion about centers, and a brake for arresting the rotation of said pulley, substantially as described.

6. A power-transmitting device connecting a driving-shaft with a driven mechanism, consisting of a set of gear-wheels, one of said gear-wheels having a rotary and also an oscillating motion, a rotatory pulley normally rotating with said oscillating wheel and connected thereto by guide mechanism having a swinging motion in two directions, and a brake for arresting the rotation of said guide-bearing, substantially as described.

7. A power-transmitting device connecting a driving-shaft with a driven mechanism, consisting of a set of gear-wheels, one of said gear-wheels having a rotary and also an oscillating motion, and a restrainable guide-bearing normally moving with said oscillating wheel and connected thereto by guide mechanism joined at one end to the guide-bearing by a universal joint and at the other end to the oscillating wheel by a like joint, substantially as described.

8. A power-transmitting device connecting a driving-shaft with a driven mechanism, consisting of a sun-and-planet gear one member of which is in operative connection with the driving-shaft and the other with the driven mechanism, a restrainable guide-bearing normally moving with the oscillating member of said sun-and-planet gear, and guide mechanism for restraining the motion of said oscillating gear when the guide-bearings are restrained, substantially as described.

9. A power-transmitting device connecting a driving-shaft with a driven mechanism, consisting of a sun-and-planet gear, a restrainable guide-bearing normally moving with the oscillating member of said gear, and guide mechanism for restraining the motion of said oscillating member when the guide-bearing is restrained, said guide mechanism made up of parts having a swinging motion in two directions, substantially as described.

10. A power-transmitting device connecting a driving-shaft with a driven mechanism, consisting of a sun-and-planet gear, a movable guide-bearing connected with the oscillating member of said sun-and-planet gear by guide mechanism having a swinging motion in two directions, and a brake for arresting the movement of said guide-bearing, substantially as described.

11. A power-transmitting device connecting a driving-shaft with a driven mechanism, consisting of a sun-and-planet gear, a rotatory pulley connected with the oscillating member of said gear by guide mechanism having a swinging motion in two directions, and a brake for arresting the rotation of said pulley, substantially as described.

12. A power-transmitting device connecting a driving-shaft with a driven mechanism, consisting of a sun-and-planet gear, a guide-bearing, and swinging connecting guide mechanism joined at one end to the guide-bearing by a universal joint and at the other end to the oscillating member of the gear by a like joint, substantially as described.

13. A power-transmitting device connecting a driving-shaft with a driven mechanism, consisting of a sun-and-planet gear, a rotatory pulley mounted on the driving-shaft, a sleeve encircling said shaft and connected at one end to the pulley by a universal joint and at the other end to the driving member of the gear by a like joint, and a brake for said pulley, substantially as described.

14. A power-transmitting device connecting a driving-shaft with a driven mechanism, consisting of a sun-and-planet gear the driving member of which is mounted within the driven member and is in operative connection with the driving-shaft, a restrainable guide-bearing normally moving with the driving member of said sun-and-planet gear, and guide mechanism for restraining the motion of said driving member when the guide-bearing is restrained, substantially as described.

15 A power-transmitting device connecting a driving-shaft with a driven mechanism, consisting of a sun-and-planet gear the oscillating member of which is mounted within the driven member and is in operative connection with the driving-shaft, and a restrainable guide-bearing normally moving with said driving member and connected therewith by guide mechanism having a swinging motion about centers, substantially as described.

16. A power-transmitting device connecting a driving-shaft with a driven mechanism, consisting of a set of sun-and-planet gear the driving member of which is mounted within the driven member and is in operative connection with the driving-shaft, a movable guide-bearing connected with the said driving member by guide mechanism having a swinging motion about centers, and a brake for arresting the movement of said guide-bearing, substantially as described.

17. A power-transmitting device connecting a driving-shaft with a driven mechanism, consisting of a set of sun-and-planet gear the driving member of which is mounted within the driven member and is in operative connection with the driving-shaft, a guide-bearing, and a swinging connecting-piece joined at one end to the guide-bearing by a universal joint and at the other end to the driving member of the gear by a like joint, substantially as described.

18. A power-transmitting device for connecting a driving-shaft with a driven mechanism, consisting of a set of sun-and-planet gear the driving member of which is mounted within the driven member and is in operative connection with the driving-shaft, a rotatory pulley mounted on the driving-shaft, and a sleeve encircling said shaft and connected at one end to the pulley by a universal joint and at the other end to the driving member of the gear by a like joint, and a brake for said pulley, substantially as described.

19. A power-transmitting device for connecting a driving-shaft with a driven mechanism, consisting of a set of sun-and-planet gear, a rotatory pulley mounted upon the driving-shaft, a sleeve encircling said driving-shaft and having a pair of oppositely-disposed lugs at each of its ends, a ring encircling said driving-shaft and connected to the driving member of the sun-and-planet gear and to the lugs upon the proximate end of the sleeve by trunnion-pins, and a similar ring connecting in like manner the opposite end of the sleeve with the pulley, and a brake for said pulley, substantially as described.

20. In a power-transmitting device, the combination of a driving-shaft provided with an eccentric fast thereon, a hollow driven shaft provided with a so-called "sun-wheel" and mounted upon said driving-shaft, a planet-wheel mounted upon the eccentric and engaging with the sun-wheel, a rotatory pulley mounted upon the driving-shaft, a swinging sleeve connected at one end to the planet-wheel by a universal joint and at the other to the pulley by a like joint, and a brake for said pulley, substantially as described.

21. In a power-transmitting device of the kind described, the combination, with the rotatory pulley, of a brake therefor, consisting of pivoted brake-blocks disposed at opposite parts of the periphery of said pulley, links to which the brake-blocks are attached, a shaft having projecting lugs to which the links are attached, and arms for turning said shaft in one direction or the other, so as to apply or release the brake, substantially as described.

22. A power-transmitting device for connecting a driving-shaft with a driven mechanism, consisting of a set of gear-wheels, one of said wheels having a rotary and also an oscillating motion, a bearing, and a guide mechanism joined on the one side to the bearing by a universal joint and on the other side to the oscillating wheel by a like joint, whereby the tendency to rotary motion of the oscillating wheel is restrained, substantially as described.

23. A power-transmitting device for connecting a driving-shaft with a driven mechanism, consisting of a set of sun-and-planet gear-wheels, a bearing, and a guide mechanism joined on the one side to said oscillating member by a universal joint and on the other side to said bearing by a like joint, substantially as described.

24. A power-transmitting device for connecting a driving-shaft with a driven mechanism, consisting of a set of sun-and-planet gear-wheels, the oscillating wheel of which set is mounted within the other wheel, a bearing, and a guide mechanism joined on the one side to said bearing by a universal joint and on the other side to the oscillating gear-wheel by a like joint, whereby the tendency to rotary motion of the oscillating wheel is restrained, substantially as described.

25. A power-transmitting device for connecting a driving-shaft with a driven mechanism, consisting of a set of gear-wheels connecting the two, one of said wheels having a rotary and also an oscillating motion, a bearing, a sleeve encircling the driving-shaft and having a pair of oppositely-disposed lugs at each of its ends, a ring encircling the driving-shaft and connected to said oscillating wheel by trunnion-pins and to the lugs upon the proximate end of the sleeve by like pins, and a similar ring connecting in like manner the opposite end of the sleeve with the bearing, substantially as described.

26. A power-transmitting device connecting a driving-shaft with a driven mechanism, consisting of a set of gear-wheels, one of said wheels having a rotary and also an oscillating motion, a rotatory pulley mounted concentrically with the driving-shaft normally rotating with said oscillating wheel, and guide mechanism for restraining the rotary motion of said oscillating wheel when the rotation of the pulley is restrained, substantially as described.

27. A power-transmitting device connecting a driving-shaft with a driven mechanism, consisting of a set of sun-and-planet gear, a rotatory pulley mounted concentrically with said driving-shaft normally rotating with the oscillating wheel of said gear, and guide mechanism for restraining the rotary motion of said oscillating gear when the rotation of the pulley is restrained, substantially as described.

In testimony whereof I have hereunto set my hand in the presence of two subscribing witnesses.

WILLIAM MAIN.

Witnesses:
 T. H. PALMER,
 J. J. KENNEDY.